United States Patent [19]

Decruyenaere

[11] 3,953,959
[45] May 4, 1976

[54] HEADER HEIGHT CONTROL MECHANISM

[76] Inventor: Trudo Marie Joseph Decruyenaere, L.De Boningestraat 39, B-8610 Wevelgem, Belgium

[22] Filed: June 10, 1974

[21] Appl. No.: 477,886

[30] Foreign Application Priority Data

June 14, 1973 Germany............................ 2330271
May 16, 1974 Germany............................ 2423841

[52] U.S. Cl. ................................................ 56/208
[51] Int. Cl.² ......................................... A01D 67/00
[58] Field of Search ........................... 56/208–217; 172/663–668

[56] References Cited
UNITED STATES PATENTS

| | | |
|---|---|---|
| 3,088,264 | 5/1963 | Sallee................................ 56/208 X |
| 3,151,429 | 10/1964 | Dyrdahl............................ 56/208 X |
| 3,238,709 | 3/1966 | Williams................................ 56/208 |
| 3,417,555 | 12/1968 | Watkins et al........................ 56/208 |
| 3,509,701 | 5/1970 | Clarke ................................ 56/208 |
| 3,548,573 | 12/1970 | Krehbiel ............................. 56/208 |
| 3,686,838 | 8/1972 | Comeau et al..................... 56/208 X |

Primary Examiner—Paul E. Shapiro
Attorney, Agent, or Firm—Frank A. Seemar; John R. Flanagan; Joseph A. Brown

[57] ABSTRACT

A height control mechanism for adjustably supporting a header mounted on a base unit of an agricultural harvesting machine. Support for the header is provided by a pivotal connection to the base unit, a plurality of ground engaging slide shoes and one or more hydraulic cylinders extending between the base unit and the header. The hydraulic cylinders are operatively associated with a compensation mechanism adapted to control the height of the header during operation.

Ground sensing members and shut-off means operably associated therewith and with the hydraulic cylinders, are provided for selectively cutting off the discharge of hydraulic pressure fluid from said hydraulic cylinders when at least one ground sensing member contacts the ground and for making the compensation mechanism fully operative.

11 Claims, 8 Drawing Figures

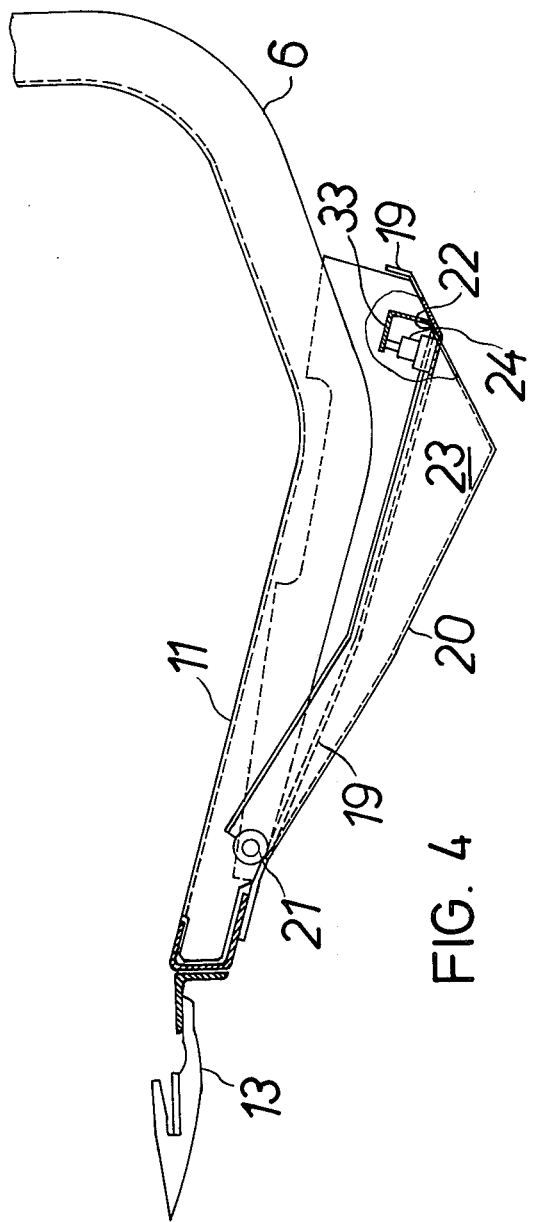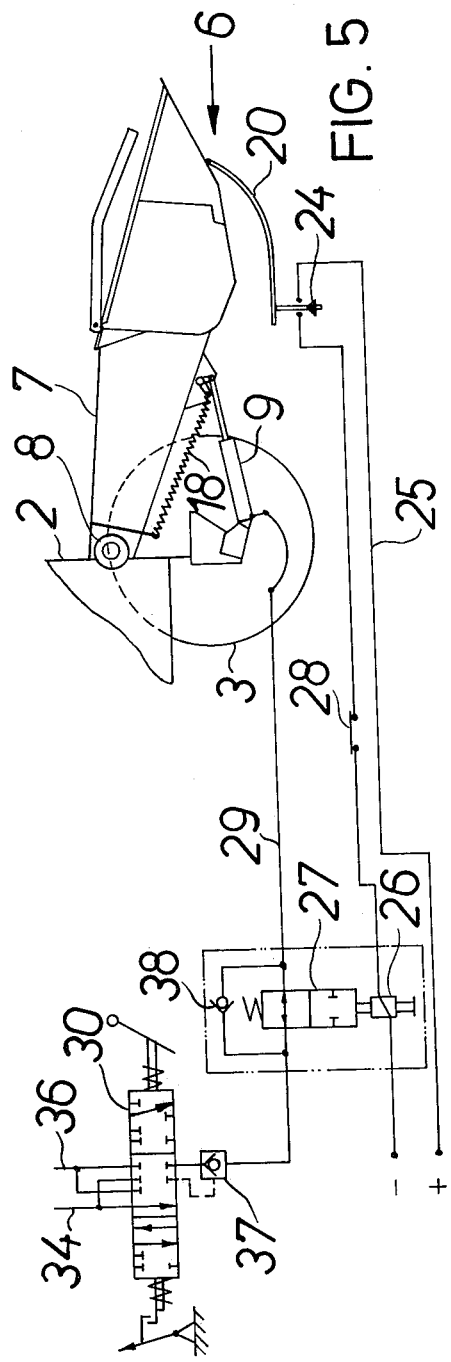

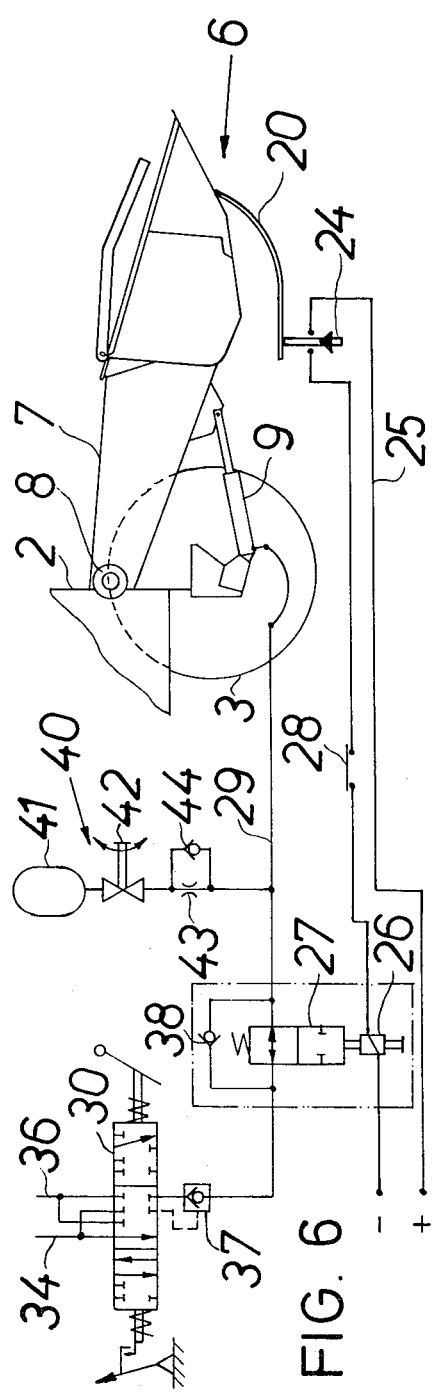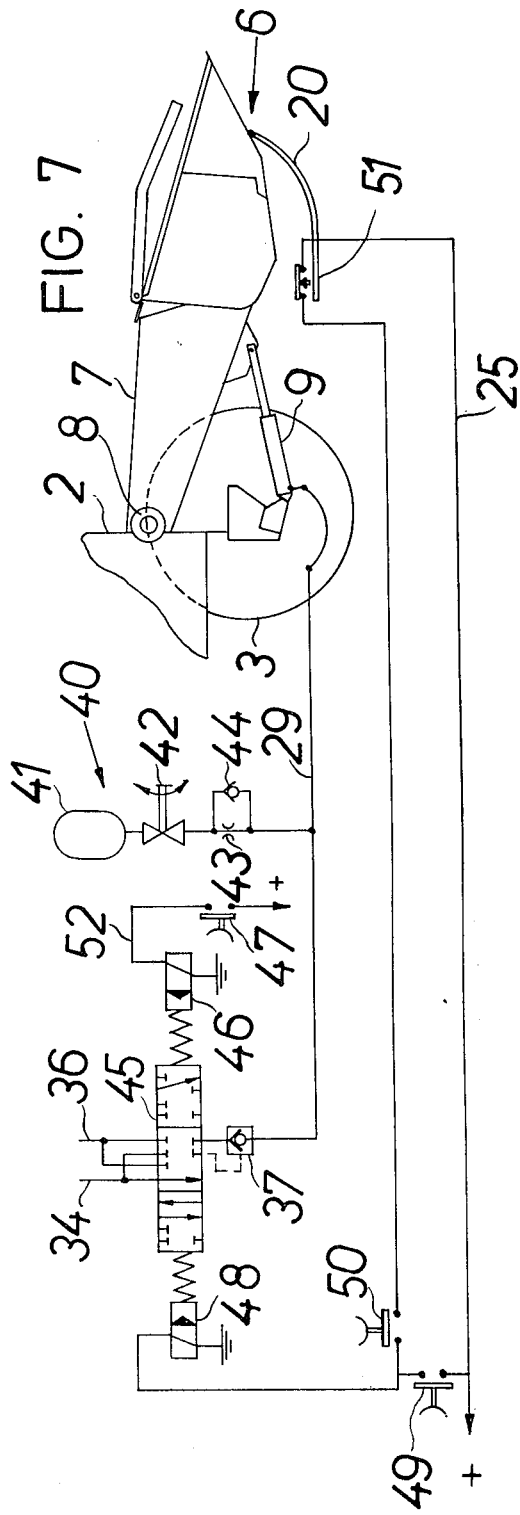

HEADER HEIGHT CONTROL MECHANISM

BACKGROUND OF THE INVENTION

Field of the Invention

The invention relates to agricultural machines, such as combine harvesters, having a header or similar attachment for harvesting or otherwise operating on a crop.

Description of the Prior Art

Such machines are known to have automatic height adjusting means for automatically adjusting the position of the header above the ground. One form of known automatic header height control means for combines comprises one or more ground sensing members pivotally connected to the header and arranged to control a hydraulic lifting mechanism for the header. This is to say that the ground sensing members detect elevations and depressions in the terrain and control the supply of fluid to or the discharge of fluid from the header lifting mechanism accordingly. Therefore, the ground sensing members are coupled in some way to a hydraulic valve included in the hydraulic header lifting mechanism. This type of header height control mechanism can operate satisfactorily and relieves the operator from having continuously to check and readjust the position of the header relative to the ground. However, this type of automatic header height control mechanism has a number of disadvantages of which an important one resides in the fact that such mechanisms have a rather complicated structure and are therefore relatively expensive to manufacture. Also, it is desirable to sense the ground contours at a location in front of the header cutter mechanism which can best be accomplished by providing the ground sensing members underneath the normal crop dividers which extend at the side edges of the header and in front thereof. However, as a result, any terrain variations located between the side edges of the header are not detected.

According to other approaches made in the past, less complicated and hence less expensive automatic header height adjusting mechanisms comprising header weight-compensation means have been proposed. These types of adjusting mechanisms are generally known as header compensation mechanisms and resilient means are provided to support a portion of the header weight. The resilient means may be of any suitable type such as the mechanical type comprising tension springs or compensation springs, or of the hydro-pneumatic type comprising a hydro-pneumatic accumulator. In operation, the header is lowered until it contacts the ground under a certain pressure, whereby a portion of the weight of the header is supported on the ground. In this normal header operating position, an equilibrium is set up in which a major portion of the header weight is supported by the weight-compensation mechanism and the header pivot means to the basic unit and in which the remainder of the weight is supported on the ground as already indicated. If, during forward movement of the machine in the field, a ground irregularity is met, e.g. an elevation, then the equilibrium referred to is disturbed as an increased portion of the header weight is then supported on the ground. The weight-compensation mechanism is operative to reinstate equilibrium by raising the header in accordance with the magnitude of the elevation causing the disturbance. If, on the contrary, a depression in the ground is met, then the header weight-compensation mechanism is operative to readjust the position of the header in the reverse direction. It is thus seen that the header is arranged to float over the ground irrespective of ground irregularities.

In general, the header weight-compensation mechanism at present known in the art operate in an appropriate manner provided the initial ground pressure of the header is accurately set. Header weight-compensation mechanisms have, as mentioned already, the advantage of being less complicated, and hence less expensive, than other systems. Nevertheless such mechanisms all have an important common disadvantage.

To function appropriately it is an absolute requirement for the operator to pre-set the header in an optimum position. This means that the initial ground pressure of the header should neither be too high nor too low. If the ground pressure is too high, then the resilient weight-compensation means has to expand to an extent that they are no longer able sufficiently to raise the header upon meeting an elevation in the ground. As a result, the header tends to dig in the ground. If, however on the contrary, the initial ground pressure is too low, then it might happen that during operation the header temporarily loses contacts with the ground.

In practice, this pre-setting of the header has proved to be very critical and difficult to achieve. Furthermore, it has been experienced that continuous attention should be given to the operation of the header weight-compensation means because from time to time readjustment of the pre-set position of the header is required. Also, it should be kept in mind that the hydraulic header lifting mechanism is arranged to raise and lower the header comparatively fast. This lack of fine control aggravates the problem of pre-setting the header in the operative condition.

In still another approach to the problem, an automatic header weight-compensation mechanism has been provided comprising pressure-responsive components in the hydraulic circuitry operable to shut off fluid discharge from the hydraulic lifting mechanism when the pressure on a hydro-pneumatic accumulator reaches e.g. 85% of the maximum pressure (this means 85% of the pressure when the header is fully raised). In other words, in this arrangement about 85% of the weight of the header is supported by the hydraulic lifting mechanism while the remainder of the weight is supported on the ground. The operation is as follows: assuming that the system is in its "automatic" position and assuming that initially the header is fully raised, then the pressure in the lifting mechanism and the hydro-pneumatic accumulator is at its maximum. As a result, a pressure-responsive relief valve, which is pre-set at e.g. 85% of the maximum pressure, opens and hydraulic fluid can drain from the hydraulic lifting mechanism and the accumulator, whereby the header is lowered. This lowering continues until 15% of the header weight is supported directly on the ground, whereupon the relief valve shuts off further discharge of hydraulic fluid.

An important disadvantage of this arrangement resides in the fact that the shutting off operation is not initiated unless the header touches the ground, and as a result of the inertia of the system, the minimum ground pressure of the header cannot be held below a certain value as is sometimes absolutely necessary to ensure adequate operation of the system without the tendency of the header to dig into the ground.

In still a further approach, which is to some extent similar to that just described, a pressure-responsive relief valve is included in the hydraulic circuitry and is operable to shut off the fluid supply to the hydraulic lifting mechanism and the hydro-pneumatic accumulator (rather than the fluid discharge therefrom) as soon as a predetermined pressure is reached. Simultaneously, fluid discharge from the lifting mechanism and the accumulator is also prevented. From that moment onwards, the pressure line of the hydraulic pump is connected to the return line via the relief valve. This is also disadvantageous as the relief valve, which is operative most of the time, will heat the hydraulic fluid and unnecessarily consume a considerable amount of horsepower.

Furthermore, all systems employing pressure-responsive relief valves have the common disadvantage of only enabling slow movement of the header, particularly when the actual pressure is close to the opening pressure of the relief valve. It is the principal object of this invention to overcome or attenuate these disadvantages.

SUMMARY OF THE INVENTION

According to the present invention an agricultural machine comprises a base unit and a header mechanism mounted thereon, hydraulic means adjustably to support the header mechanism relative to the base unit, header weight-compensation means operable to enable the header mechanism to float over ground irregularities, and one or more ground sensing member mounted on the header mechanism and operable to interrupt operation of the hydraulic means when one ground sensing member contacts the ground in use of the machine. The invention is particularly useful when applied to a combine harvester but it is to be understood that the invention is not so limited because it is also applicable to other machines such as, for example, forage harvesters which are equipped with a header comprising a cutter bar or pick-up means, windrowers, and mower-conditioners.

Preferably the hydraulic means adjustably supporting the header mechanism comprise hydraulic cylinders, a pressure fluid supply pump, and a manually operable control valve having three main positions, namely a neutral position, a "header raising" position and a "header lowering" position. Shut-off means may be provided between the manually operable control valve and the hydraulic cylinders and the shut-off means may be controlled by an electric circuit comprising an electric coil associated with the shut-off means and electric switch means operatively associated with a ground sensing member such that the shut-off means are actuated upon contact of the sensing member with the ground.

Alternatively, the shut-off means may be formed by the manually operable control valve, which would be arranged automatically to return to the neutral, shut-off position upon contact of the sensing member with the ground. In another embodiment, the shut-off means may be arranged in a control line of a non-return or check valve associated with the main valve, the shut-off means being operable to close the non-return valve as soon as a ground sensing member engages the ground. A restrictor may be provided between the main valve and the shut-off means, and a pressure relief valve arranged in the pressure line to the main valve.

The header weight-compensation mechanism may be of any type. However, in the case of a hydro-pneumatic type, a hydro-pneumatic accumulator is arranged between the shut-off means and the hydraulic cylinders.

IN THE DRAWINGS

A combine harvester embodying the present invention will now be described in greater detail, by way of example, with reference to the accompanying drawings, in which:

FIG. 4 is a sectional view on a further enlarged scale of the portion IV of FIG. 2, FIG. 5 shows electro-hydraulic circuitry of the combine harvester of FIGS. 1 to 4, and FIGS. 6, 7 and 8 are similar to FIG. 5 but showing respective alternative arrangements of hydraulic circuitry.

DETAILED DESCRIPTION OF THE PREFERRED EMBODIMENT

Figure 1:
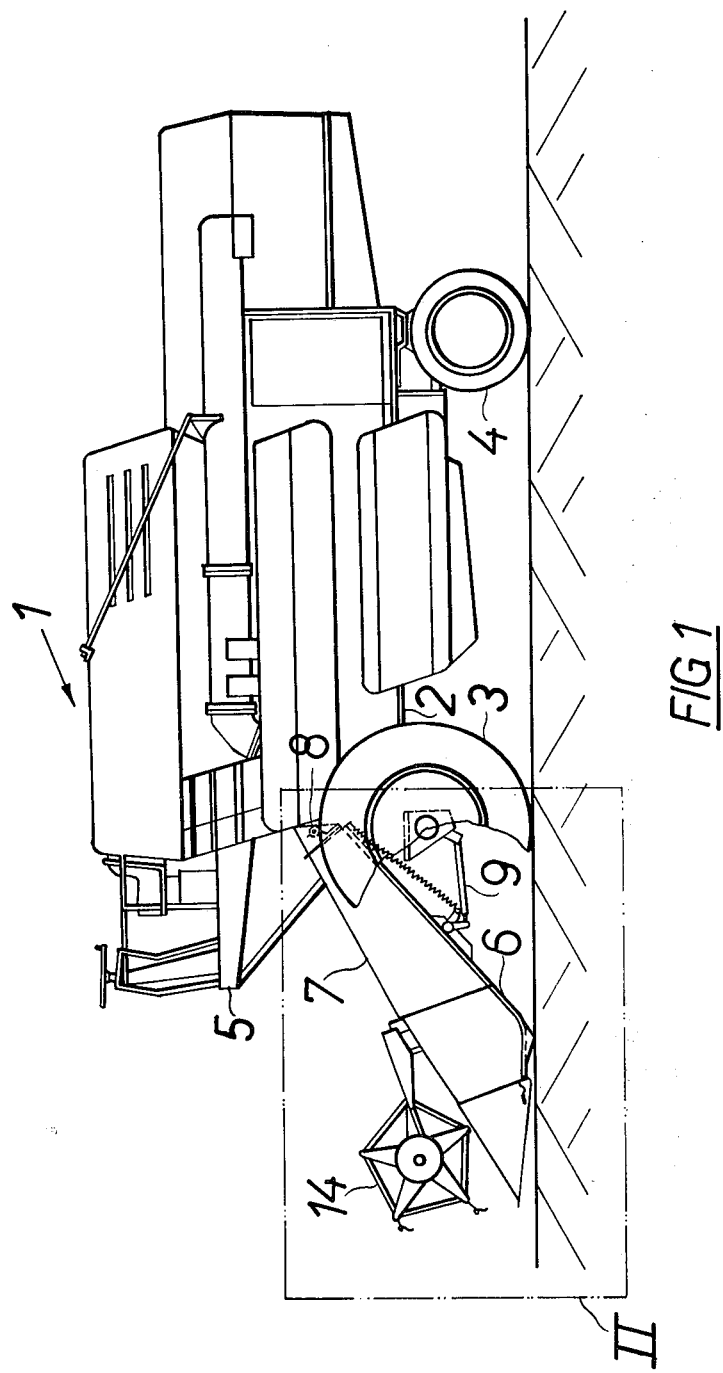
FIG. 1 is a somewhat diagrammatic side elevation of the combine harvester.

Referring to FIG. 1, the combine is generally indicated at 1 and comprises a main frame or base unit 2 supported on front drive wheels 3 and smaller rear steerable wheels 4. Supported on the main frame 2 are an operator's platform 5, and threshing, separating and cleaning means and a grain tank (not identified). A conventional header 6 and straw elevator 7 extend forwardly of the machine and the header is pivotally attached to the frame 2 at 8 for general vertical movement which is controlled by extensible hydraulic cylinders 9 and a header weight-compensation mechanism 10. The header 6 is mainly composed of a transversally-extending trough-shaped base unit 11 having a central, rearwardly-facing discharge opening terminating at the straw elevator housing 7; a header auger arranged in the base unit 11; a cutter bar 13 at the forward edge of the base unit 11, and a reel structure 14 supported on the base unit 11.

Figure 2:
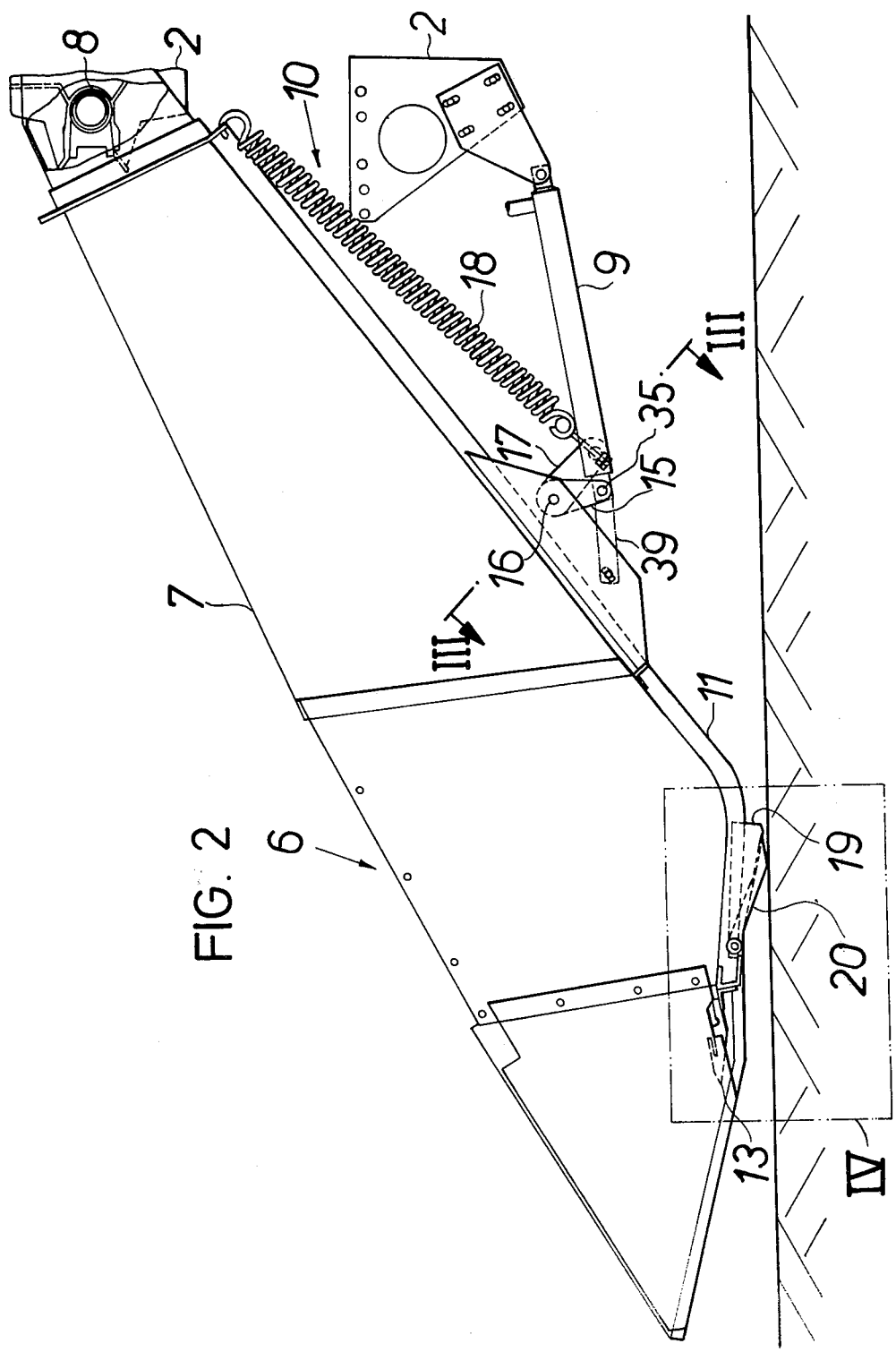
FIG. 2 is a side elevation of an enlarged scale of the portion II of FIG. 1.
Figure 3:
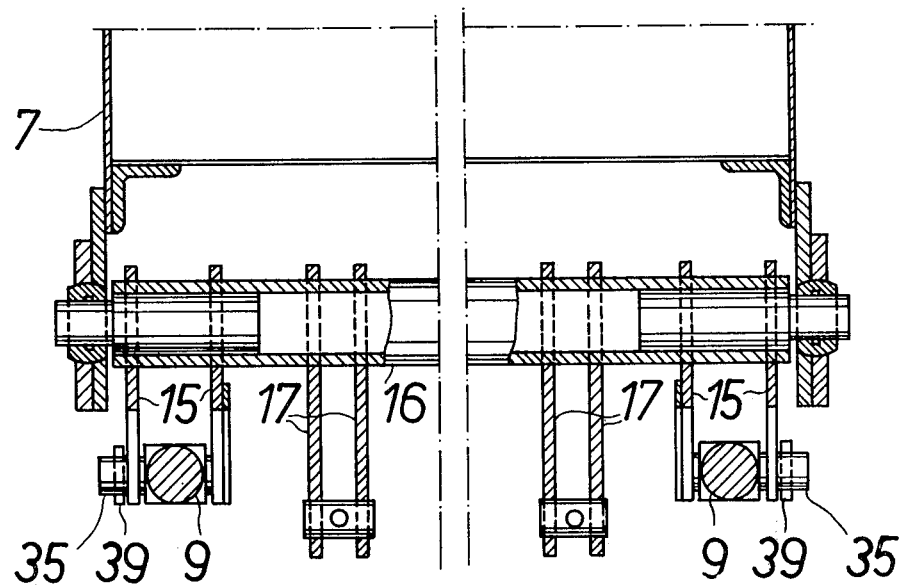
FIG. 3 is a section on the line III—III of FIG. 2.

As the combine 1 is propelled forwardly over a field with the header in the operative position (as shown in FIGS. 1 and 2), that is to say with the main body of the header slightly above ground level, the crop material which is to be harvested is severed from the stubble by the cutter bar 13 and is conveyed by the reel structure 14 and the header auger to the straw elevator 7, which in turn conveys it further rearwardly to the threshing and separating means for further treatment.

The hydraulic cylinders 9 are pivoted at one end to the main frame 2 and at the other end to respective arms or levers 15 by means of spindles 35. The levers 15 are secured to a rock shaft 16 which extends transversely of the machine underneath the straw elevator housing and is pivoted to a lower side wall of the straw elevator. The rock shaft 16 has two further levers 17 connected thereto, to which one end of respective tension springs 18 (forming part of the weight-compensation mechanism 10) extending underneath the elevator housing are connected. The tension springs 18 are secured at their other ends to the elevator housing.

A plurality of ground-engaging slide-shoes 19 are provided across and beneath the header 6 and in operation these slide shoes 19 contact the ground surface with a certain pressure, whereby a portion of the weight of the header 6 and the elevator 7 is supported on the ground. Another portion of the header and elevator weight is supported by the hydraulic cylinders 9 and the compensation mechanism 10, while the remainder of the weight is supported on the header pivot 8. An equilibrium position is thereby established between all three header and elevator supporting elements, namely the ground, the hydraulic cylinders 9 together with the compensation mechanism 10 and finally the header pivot 8. In this equilibrium position, the springs 18 have been extended to some extent by the forces exerted thereon.

During normal compensating operation, hydraulic fluid is neither discharged from nor supplied to the header lifting cylinders 9, whereby the length of these cylinders 9 remains unchanged. The hydraulic cylinders 9 are in fact only extended of contracted to raise the header towards the transport position, or to lower the header to its operative position.

As the combine is propelled forwardly over a field, ground irregularities are encountered. When the header is in the operative position and when an elevation in the ground level is encountered, then a large portion of the weight of the header 6 and the straw elevator 7 is supported on the ground and consequently, a reduced force acts on the hydraulic cylinders 9 and the header weight-compensation mechanism 10, whereby the aforementioned equilibrium is disturbed. As a result, the whole system moves towards another equilibrium position. The compensation springs 18 contract and, since the length of the hydraulic cylinders 9 remains unchanged, the cylinders 9 are pivoted upwardly with the result that the rock shaft 16 is rotated which in turn raises the levers 15, 17. Consequently, the header 6 and the elevator 7 are also pivoted upwardly and thus the ground pressure is reduced accordingly, whereby finally a new equilibrium position, in which the header is positioned at a higher level with respect to the ground, is established.

When a depression in the ground is encountered, the whole system reacts in a similar manner but in the reverse direction. It is thus seen that during operation the header 6 floats so as to be able to accommodate ground irregularities. However, the header weight-compensation mechanism 10 will not operate in the aforementioned manner unless the initial header position is accurately adjusted.

In between the various slide shoes 19, rearwardly-extending pivotable ground sensing members 20 are provided to sense the ground level. A pivot shaft 21 for each of the ground sensing members 20 is located slightly behind the cutter bar 13 and extends transversely of the combine. The ground sensing members 20 have generally the same shape as the slide shoes 19 and respectively extend over substantially the total width of the gap formed between the two neighbouring slide shoes 19. Downward pivotal motion of the members 20 is restricted by abutments 22 which hook behind the rear ends of the corresponding slide shoes 19. The ground sensing members 20 have upwardly-extending side-walls 23 extending past the slide shoes 19 and arranged in a substantially sealing relationship therewith to prevent accumulation of dirt, waste material etc. above the slide shoes 19 and the ground sensing members 20.

Referring more particularly to FIG. 4, switch means in the form of electric contacts 24, included in electric circuitry 25 which further comprises an electric coil 26 of a hydro-electric shut-off valve 27 and an additional electric contact 28, are arranged for actuation by the ground sensing members 20. The hydro-electric shut-off valve 27 is arranged in the hydraulic circuitry 29 between a conventional manually-operable main control valve 30 on the one hand, and the hydraulic cylinders 9 on the other hand. The specific structure of the electric contacts 24 and the relationship thereof with respect to each other are chosen in such a manner as to ensure actuation of the hydro-electric shut-off valve 27 as soon as at least one ground sensing member 20 is lifted or pivoted as a result of contact thereof with the ground. The contacts 24 are of the normally-closed type which are opened by the respective ground sensing members 20 when in their lowermost position, and are arranged in an electrically parallel relationship with respect to each other. The contacts 24 are secured to the upper side of the rear end of the respective slide shoes 19, and the ground sensing members 20 have at their rear ends extensions 33 to engage with the contacts 24.

The manually-operable control valve 30 can be shifted to a neutral shut-off position, a "header raising" position or a "header lowering" position. This main valve 30 is coupled to a pressure line 34 and a return line 36. The hydraulic circuitry 29 also comprises a non-return or check valve 37 operable, when the main valve 30 is in its neutral position, to prevent lowering of the header 6 due to fluid leakage which normally would occur in the main control valve 30. The non-return valve 37 is hydraulically opened by shifting the main valve 30 to the "header lowering" position.

The shut-off valve 27 is normally open and upon energisation of the coil 36 through the closing of one of the contacts 24 is shifted to the shut-off position to prevent any discharge of fluid from the header lifting cylinders 9. Connected in parallel to the shut-off valve 27 is a non-return valve 38 operable to supply fluid to the hydraulic cylinders 9 even when the shut-off valve 27 is in its cut off position.

Finally, a link 39 (FIG. 2) is provided to prevent contraction of the springs 18, and a corresponding raising of the elevator 7, when the header 6 is disconnected from the elevator 7.

Operation

When the combine is required for use, the operator shifts the main valve 30 to its "header lowering" position, whereby as the shut off valve 27 is open, hydraulic fluid is discharged from the cylinders 9 so that the header is lowered from the position shown in FIG. 4 towards the operative position of FIG. 2. As soon as at least one ground sensing member 20 engages the ground and is thereby pivoted relative to the header 6, the corresponding electric contact 24 is closed which results in energisation of the coil 26, which in turn results in the shut off valve 27 being shifted to its cut-off or closed position. Due to the inertia in the system, the lowering movement of the header 6 is not stopped immediately upon engagement of the ground sensing member 20 with the ground surface but continues such that the header is further lowered a short distance. Further maintaining the main valve 30 in its "header lowering" position has no effect on the position of the header. In this position of the header the slide shoes 19 contact the ground with a certain pressure and the header weight-compensation mechanism 10 becomes operative in the manner explained above.

In order to raise the header 6 to the transport position, it is sufficient for the operator to shift the main valve 30 to the "header raising" position whereupon hydraulic fluid under pressure is supplied via the non-return valve 38 to the header lifting cylinders 9 to extend the same.

Opening the normally closed contact 28, which is arranged in series relationship with the contacts 24, enables the operator to lower the header 6 even further than the normal operative position. This is especially advantageous when disconnecting the header 6 from the elevator 7 and placing the header 6 on a trailer for transport purposes or for depositing the header 6 on the ground, for example.

Modifications

Referring now to FIG. 6 illustrating an alternative embodiment, it will be seen that the mechanical weight-compensation mechanism 19 has been replaced by a hydro-pneumatic weight-compensation mechanism 40 comprising a hydro-pneumatic accumulator 41 coupled to the hydraulic circuitry 29 at a location in between the shut off valve 27 and the header lifting cylinders 9 via an accumulator cock 42, a restrictor 43 and a non-return valve 44. The shut-off valve 27 operates in a manner identical to that already described with respect to the embodiment of FIGS. 1 to 5. The compensation operation of the hydro-pneumatic system 40 is well known in the art and need not therefore be described in any further detail.

In the embodiment according to FIG. 7, the weight-compensation mechanism 40 is identical to that illustrated in FIG. 6. The main valve 30 of the type employed in the FIG. 5 and 6 embodiments has however been replaced by a solenoid-operated control valve 45 having a "header raising" solenoid 46 and a "header lowering" solenoid 48. An electric circuit 52 associated with the raising solenoid 46 comprises a normally open contact 47 while the circuit 25 of the lowering solenoid 48 comprises a normally open contact 50, a series of normally-closed contacts 51 actuatable by the ground sensing members 20, and a normally open contact 49. All the contacts 50, 51 are arranged in a series relationship while the contact 49 is connected in parallel relationship with respect to the contacts 50, 51. The ground sensing members 20 are operable to open the contacts 51 when raised with respect to the header 6 as a result of contact with the ground. In operation, the operator closes the contact 50 which energises the solenoid 48 to effect lowering the header 6. As soon as at least one of the ground sensing members 20 contacts the ground and is pivoted relative to the header, the corresponding contact 51 is opened, whereby the solenoid 48 is de-energised even though the operator may continue to close contact 50. The downward movement of the header 6 is thus interrupted although again, some slight further lowering occurs due to the inertia of the system. In this position the compensation mechanism 40 operates as explained hereinbefore. Further lowering of the header, for example to disconnect the header 6 from the elevator 7, is only possible by closing the solenoid 49. Raising of the header 6 is achieved by closing the contact 47 which energises the solenoid 46.

Figure 8:
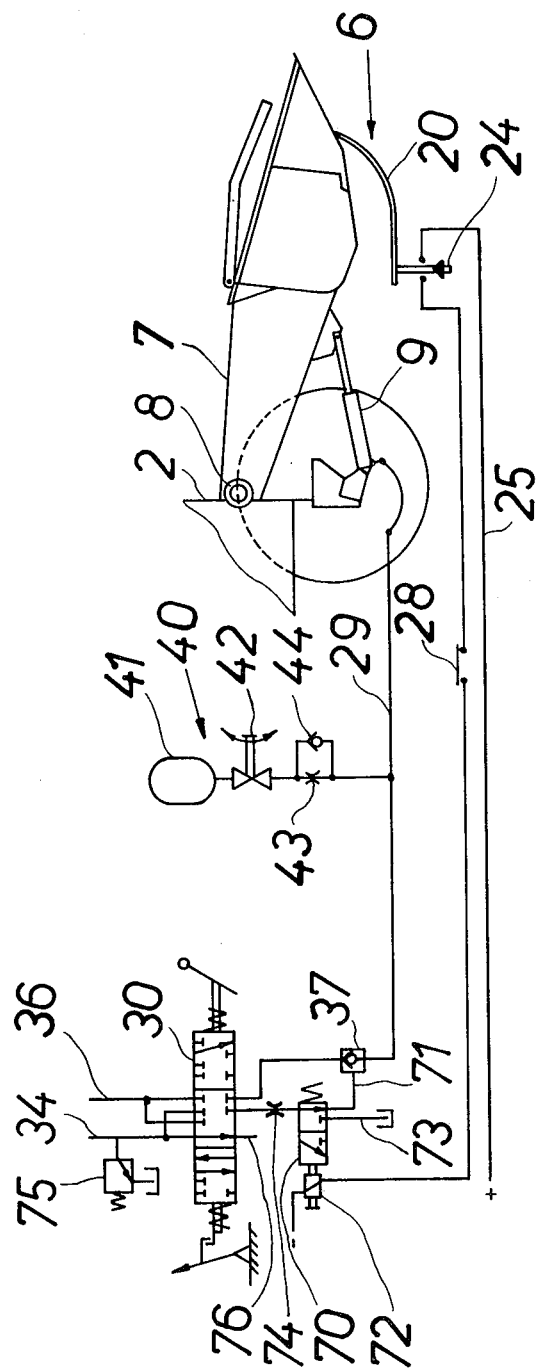

Referring now to the embodiment according to FIG. 8, it will be seen that again identical components are indicated by similar reference numerals. The compepnsation mechanism 40 is again of the hydro-pneumatic type and comprises the components 41 to 44. Also the main valve 30 is identical to the one shown in FIGS. 5 and 6. The shut off valve 27 and the non-return valve 38 of the previous arrangements according to FIGS. 5 and 6 are relatively large structures in order that they can handle the comparatively large throughputs of hydraulic fluid. Hence these structures are also rather expensive. In the arrangement according to FIG. 8 a relatively small shut-off valve 70 is employed. The shut off valve 70 in this embodiment is located in the control or opening line 71 of the non-return or check valve 37. The shut off valve 70 again comprises an electric coil 72 included in the electric circuitry 25 which again comprising the normally closed contact 28 and the contacts 24. The contacts 24 are arranged in parallel relationship with each other and are opened by the ground sensing members 20 when in their lowermost ground-engaging position relative to the header and closed by the members 20 when raised relative to the header. The shut off valve 70 is of the normally open type until shifted to the cut-off or closed position by the energisation of the coil 72. The shut off valve 70 further comprises a return line 73. The control or opening line 71 further comprises a restrictor 74 located between the main valve 30 and the shut off valve 70. Finally, a pressure-relief valve 75 has been arranged in the feed line 34 of the main valve 30. Now turning to the operation of the embodiment of FIG. 8, it is assumed that the header 6 is in the fully raised position of FIG. 8. To lower the header 6, the operator shifts the main valve 30 to the "header lowering" position. As at this moment, the shut-off valve 70 is open, pressure fluid is supplied via the control or opening line 71 to the check valve 37, whereby the latter is opened. As a result, fluid drains from the header lifting cylinders 9 and hence the header 6 is lowered. During this operation, the pressure-relief valve 75 is operable to supply any excessive pressure fluid directly into the return line. Lowering of the header 6 continues until at least one ground sensing member 20 contacts the ground and thereby closes the associated contact 24. At that moment the coil 72 is energised (provided the contact 28 is also closed) and the shut-off valve 70 is shifted to the cut-off position so that further discharge of fluid from the cylinders 9 is prevented and the lowering of the header 6 interrupted. Further lowering of the header 6 interrupted. Further lowering of the header is prevented even though the main valve 30 might be maintained in the "header lowering" position as the non-return valve 37 becomes operative. During this operation, pressure fluid supplied to the shut-off valve 70 is discharged into the return line 73. Excessive pressure in the feed line is, in this condition of the system, relieved through the pressure relief valve 75. The quantity of fluid passing through the shut off valve 70 is in either position thereof relatively small due to the provision of the restrictor 74. Hence the shut off valve 70 may be a small and light structure. As soon as the main valve 30 is returned to the neutral position, the pressure fluid is further supplied to a return line 76 and hence the pressure relief valve 75 is closed again. The operation of the weight-compensation mechanism 40 as well as the raising operation of the header 6 are identical with those described with respect to the FIG. 6 embodiment. Finally, if for some reason the header 6 is to be lowered below its normal operative position, the contact 28 is opened whereupon the shut off valve 70 returns to the open condition.

Further modifications and alterations to the described embodiments of the invention may be made. For example, the hydraulic shut off valves 27 and 70 may be replaced by a pneumatic, an electro-magnetic, a mechanical or other type of shut-off means. Also the ground sensing members 20 and slide shoes 19 may be replaced by a single resilient slide shoe which extends over substantially the total width of the header 6 and which is operable also as a sensing member similar to those described above. Alternatively, the ground sensing members 20 may be replaced by other sensing members in the form of, for example, movable crop lifters, movable crop dividers, sensing members incorporated in fixed crop dividers, etc. Also the ground sensing members 20 and the associated contacts 24 may be replaced by a plurality of ground sensing members of circular or other section which extend between adjacent slide shoes 19 and which are operatively associated with a single transversely-extending rock shaft. The rock shaft extends underneath the header and slightly rearwardly of the cutter bar and can be rotated by any of the ground sensing members. A single contact similar to the contacts 24 or 51 is arranged for actuation by the rock shaft upon rotation thereof. Also, the ground sensing members 20 may be spring loaded in order positively to urge them towards the ground. It will be clear that with all of the foregoing arrangements it is possible to adjust the ground pressure of the header to relatively low values, even to zero if this were necessary merely by adjustment of the point of actuation of the contacts 24 or 51, as appropriate.

From the foregoing description of various embodiments, it will be appreciated that the present invention enables the initial operative position of the header mechanism of the machine to be set with repeatable accuracy, rather than relying on operator skill. Thus the header weight-compensation means is always set in the optimum position at the beginning of machine operation.

I claim:

1. In an agricultural harvester machine comprising a base unit and a header mounted thereon, a height control mechanism for said header comprising:
    a. hydraulic means for adjustably supporting the header relative to the base unit, said hydraulic means including at least one hydraulic cylinder;
    b. a hydraulic pressure fluid supply pump and a main control valve coupled to the hydraulic cylinder, the main control valve having a neutral position for maintaining fluid pressure at the level at which it is interrupted, a header lowering position for discharging fluid from said cylinder, and a header raising position for supplying fluid to said cylinder;
    c. header weight compensation means operably associated with said hydraulic means and operable to enable the header to float over ground irregularities;
    d. one or more ground sensing members mounted on the header and operably associated with said hydraulic means; and
    e. means for selectively controlling the drainage of hydraulic fluid from said hydraulic means, said selective control means including shut-off means between the main control valve and the hydraulic cylinder, the shut-off means being operable to interrupt drainage of hydraulic fluid from the hydraulic cylinder as soon as at least one ground sensing member engages the ground.

2. In a machine as set forth in claim 1 wherein the header weight compensation means comprises spring means extending between said header and said hydraulic means.

3. In a machine as set forth in claim 1 wherein the header weight compensation means comprises a hydro-pneumatic accumulator coupled to a hydraulic feed line of the hydraulic means adjustably supporting the header.

4. In a machine as set forth in claim 1 wherein said shut-off means is by-passed by a check valve enabling the supply of hydraulic pressure fluid to the hydraulic cylinders when the shut-off means is closed.

5. In a machine as set forth in claim 1 wherein the shut-off means has two positions, the first position enabling drainage of pressure fluid from the hydraulic cylinders, and the second position interrupting the drainage of pressure fluid.

6. In a machine as set forth in claim 1 wherein the shut-off means comprises a hydro-electric shut-off valve having an electric coil which upon energization shifts the valve to a closed position to interrupt drainage of fluid from the cylinders.

7. In a machine as set forth in claim 6 wherein the electric coil is part of an electric circuit which further comprises at least one switch means operatively associated with a ground sensing member in a manner such that the switch means is closed when the ground sensing member contacts the ground, whereupon the electric coil is energized.

8. In a machine as set forth in claim 7 wherein the electric circuit further comprises
    a. a plurality of electric switch means, each of which is operatively associated with a ground sensing member in such a manner such that said switch means is closed when the ground sensing member contacts the ground and all switch means connected electrically in parallel, and
    b. an additional, normally closed electric switch means connected in series with the other electric switch means and being manually operable for de-energizing the electric coil when being opened.

9. In an agricultural machine comprising a base unit and a header mounted thereon, a height control mechanism for said header comprising
    a. hydraulic header supporting cylinder means for adjustably supporting the header relative to the base unit,
    b. header weight compensation means operably associated with said hydraulic header supporting cylinder means and operable to enable the header to float over ground irregularities,
    c. a solenoid-operated control valve operatively associated with the hydraulic header supporting cylinder means and having a neutral position for maintaining fluid pressure at the level at which it is interrupted, a header lowering position for discharging fluid from said cylinder means and a header raising position for supplying fluid to said cylinder means,
    d. a first solenoid and associated electric circuit with an electric contact operatively coupled to the control valve and operable to effect raising of the header,
    e. a second solenoid and associated electric circuit, operatively coupled to the control valve and operable to effect lowering of the header, f. a first switch means in the second electric circuit for upon closure thereof to effect shifting of the valve to the header lowering position, g. at least one second switch means in the second electric circuit and arranged for upon actuation thereof to override the first switch means and to shift the valve to the neutral cut-off position, h. a ground sensing member mounted on the header and operatively associated with the or each second electric switch means and operable to actuate said associated second switch means upon contact thereof with the ground surface.

10. A machine as set forth in claim 9 wherein each second switch means is normally closed and is openable by movement of the associated sensing member towards the header mechanism on contacting the ground, the second switch means being arranged in series with each other and with the first switch means, the first switch means being normally open and manually closable.

11. In a machine as set forth in claim 9 wherein the second electric circuit further comprises an override electric switch means connected in parallel relationship with the first and second switch means and operable, when closed and when the control valve is in the cut-off position to shift the control valve to the header lowering position.

* * * * *

UNITED STATES PATENT OFFICE
CERTIFICATE OF CORRECTION

Patent No. 3,953,959  Dated May 4, 1976

Inventor(s) Trudo Marie Joseph Decruyenaere

It is certified that error appears in the above-identified patent and that said Letters Patent are hereby corrected as shown below:

Insert on Title Page immediately after Inventor's name:

--Assignee: Clayson N.V. Zedelgem, Belgium--.

Signed and Sealed this

Fourteenth Day of December 1976

[SEAL]

Attest:

RUTH C. MASON
Attesting Officer

C. MARSHALL DANN
Commissioner of Patents and Trademarks